(12) United States Patent
Patakula et al.

(10) Patent No.: US 7,860,234 B2
(45) Date of Patent: Dec. 28, 2010

(54) METHODS AND APPARATUS FOR ALLOCATING A RESOURCE TO ENQUEUED REQUESTS USING PREDICTED WAIT TIME BASED ON PRIOR RESOURCE CONTRIBUTION

(75) Inventors: Balaji Patakula, Parlin, NJ (US); Sami Qutub, Freehold, NJ (US); Rafal Sitkowski, Old Bridge, NJ (US); David Sokoler, Colts Neck, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1428 days.

(21) Appl. No.: 11/291,103

(22) Filed: Nov. 30, 2005

(65) Prior Publication Data

US 2007/0127690 A1  Jun. 7, 2007

(51) Int. Cl.
*H04M 3/00* (2006.01)
(52) U.S. Cl. .................... 379/266.06; 379/207.03; 379/265.01; 379/265.02; 379/265.09; 379/266.01
(58) Field of Classification Search ............ 379/265.02, 379/266.06, 265.1, 265.09, 265.12
See application file for complete search history.

(56) References Cited

U.S. PATENT DOCUMENTS

| 5,867,522 | A  | * | 2/1999 | Green et al. | .................... 372/99 |
| 6,023,681 | A  | * | 2/2000 | Whitt | ............................. 705/8 |
| 6,347,139 | B1 | * | 2/2002 | Fisher et al. | ............ 379/265.12 |
| 6,714,643 | B1 | * | 3/2004 | Gargeya et al. | ......... 379/266.06 |
| 6,741,699 | B1 | * | 5/2004 | Flockhart et al. | ........ 379/265.09 |
| 6,754,333 | B1 | * | 6/2004 | Flockhart et al. | ........ 379/266.01 |
| 7,215,759 | B2 | * | 5/2007 | Brown et al. | ............ 379/266.06 |
| 7,430,290 | B2 | * | 9/2008 | Zhu | ...................... 379/265.01 |
| 2002/0006192 | A1 | * | 1/2002 | Bengtson et al. | ........ 379/265.02 |
| 2003/0231647 | A1 | * | 12/2003 | Petrovykh | .................... 370/429 |
| 2006/0277550 | A1 | * | 12/2006 | Williams et al. | ............. 718/107 |
| 2007/0189494 | A1 | * | 8/2007 | Chauvet et al. | ......... 379/265.02 |

\* cited by examiner

*Primary Examiner*—Curtis Kuntz
*Assistant Examiner*—Phung-Hoang J Nguyen
(74) *Attorney, Agent, or Firm*—Chapin IP Law, LLC; David W. Rouille, Esq.

(57) ABSTRACT

Methods and apparatus are provided for allocating a resource to enqueued requests using a predicted wait time that is based on a prior contribution of the resource to service the requests in a particular queue. A resource is allocated to one of a plurality of requests. Each request is stored in at least one of a plurality of queues, each having a predicted wait time. Once it is determined that the resource has become available, the predicted wait times of the queues are updated based on a prior contribution of the resource to the queues; a performance level of each of the queues relative to one or more service level targets; and the resource is assigned, in response to the determination, to the request based on the evaluation. The service level targets can include one or more thresholds for the predicted wait time. The predicted wait time is based on a prior contribution of the resource to servicing one or more of the queues.

12 Claims, 3 Drawing Sheets

METHODS AND APPARATUS FOR ALLOCATING A RESOURCE TO ENQUEUED REQUESTS USING PREDICTED WAIT TIME BASED ON PRIOR RESOURCE CONTRIBUTION

FIELD OF THE INVENTION

The present invention relates generally to the allocation of resources, and more particularly, to methods and apparatus for allocating a resource to enqueued requests using a predicted wait time that is based on a prior contribution of the resource to service the enqueued requests.

BACKGROUND OF THE INVENTION

For many enterprise applications, finite resources must be allocated among a number of requests for such resources. In a network call routing system, for example, incoming calls must often be routed to an appropriate call center agent at one or more local or remote call centers. A call center often handles telephone calls for an enterprise. Typically, the telephone calls handled by a call center are incoming calls from present or potential customers of the enterprise. The incoming calls are generally distributed among a number of agents within the call center who are each trained to handle certain types of incoming calls. A call center will normally be capable of handling many different types of received calls. For example, a call center may receive calls relating to each of a multitude of different products, product types, or product families sold by the corresponding enterprise. Alternatively, or in addition, a call center may handle calls relating to different services or information dissemination functions provided by the enterprise. For example, the services and functions may include taking product orders, providing customer service, providing pricing and/or availability information, or any of a variety of other functions. The types of calls that are supported by a call center are commonly referred to as the "skills" of the call center. Each skill typically has an associated queue for storing received calls until an appropriate agent is available to process the call.

It is often desirable that each of the different skills (and thus queues) associated with a call center be handled differently by the call center. In other words, some of the skills may be deemed by the enterprise to be more important than other skills and hence are to be given more attention or a higher level of service by the call center. Thus, a service level target is often defined for each of the different skills of the call center to indicate a desired level of service for the skill. However, past techniques for achieving the desired service levels for each of the skills of a call center have generally been inadequate. That is, actual performance levels for the different skills have not accurately reflected the desired service level targets defined for those skills.

Generally, resource allocation systems attempt to balance the work load among the qualified resources that are available. Thus, in the context of a call center, a resource allocation system typically attempts to allocate an available agent based on the service level targets associated with the queues that the agent is qualified to service. For example, the resource allocation system may allocate the agent to service a call from a queue currently having the worst performance level. U.S. Pat. No. 6,14,903, entitled "Methods and Apparatus for Service State-Based Processing of Communications in a Call Center," assigned to the assignee of the present invention and incorporated by reference herein, discloses techniques for determining which of a number of predefined service states is associated with a particular skill (or queue).

Many resource allocation systems make such allocation decisions based on, for example, the actual current wait time and a predicted future wait time, often referred to as a Weighted Advance Time (WAT) or Expected Wait Time (EWT). Generally, the Weighted Advance Time predicts the next time an agent will be available to service a particular queue, if the currently available agent is not assigned to this queue. The Weighted Advance Time for a given queue can be adjusted each time the number of agents associated with the queue changes, as follows:

$$newWAT = priorWAT \times \frac{\text{prior \# of working agents}}{\text{new \# of working agents}}.$$

While this type of calculation for Weighted Advance Time dynamically adjusts to the number of agents that are available to service a queue, it suffers from one or more limitations, which if overcome, could further improve the efficiency of such resource allocation systems. In particular, this type of calculation for Weighted Advance Time assumes that every agent contributes the same amount of his or her time to servicing work from each queue. For example, U.S. Pat. No. 6,347,139, entitled "System for Automatically Routing Calls to Call Center Agents in an Agent Surplus Condition Based on Agent Occupancy," assigned to the assignee of the present invention and incorporated by reference herein, discloses a Skill Target Level Process that adjusts the Weighted Advance Time of the queues supported by an agent in proportion to the number of queues that the agent supports.

A need therefore exists for methods and apparatus for allocating a resource to enqueued requests using a predicted wait time that is based on the prior contribution of the agent to servicing the enqueued requests.

SUMMARY OF THE INVENTION

Generally, methods and apparatus are provided for allocating a resource to enqueued requests using a predicted wait time that is based on a prior contribution of the resource to service the requests in a particular queue. According to one aspect of the invention, a resource is allocated to one of a plurality of requests. Each request is stored in at least one of a plurality of queues, each having a predicted wait time. Once it is determined that the resource has become available, the predicted wait times of the queues are updated based on a prior contribution of the resource to the queues; a performance level of each of the queues relative to one or more service level targets; and the resource is assigned, in response to the determination, to the request based on the evaluation.

The performance level of each of the queues can be evaluated based on one or more predefined criteria. For example, the service level targets can include one or more thresholds for the predicted wait time. The predicted wait time is based on a prior contribution of the resource to servicing one or more of the queues. The resource can be, for example, a call agent associated with a call center.

A more complete understanding of the present invention, as well as further features and advantages of the present invention, will be obtained by reference to the following detailed description and drawings.

DETAILED DESCRIPTION

The present invention provides methods and apparatus for allocating a resource to enqueued requests using a predicted wait time that is based on prior contribution of the agents to servicing enqueued requests.

While the invention is generally illustrated in conjunction with the processing of calls in an exemplary call center, the invention is not limited to use with any particular type of call center or communication processing application. For example, the invention is applicable to the processing of both incoming and outgoing communications. The disclosed techniques can be used with automatic call distribution (ACD) systems, telemarketing systems, private-branch exchange (PBX) systems, computer-telephony integration (CTI)-based systems, as well as in combinations of these and other types of call centers. A call center in accordance with the invention may be configured using any type of network infrastructure, such as, e.g., asynchronous transfer mode (ATM), local area networks, wide area networks or Internet Protocol (IP) networks. The term "call center" as used herein is thus intended to include any type of ACD system, telemarketing system or other communication system that processes calls or other service requests, including voice calls, video calls, multimedia calls, e-mail, faxes, text chat or voice messages as well as various portions or combinations of these and other types of communications. The term "call" as used herein is intended to include any of the above-noted types of communications as well as portions or combinations of these and other communications.

Figure 1:
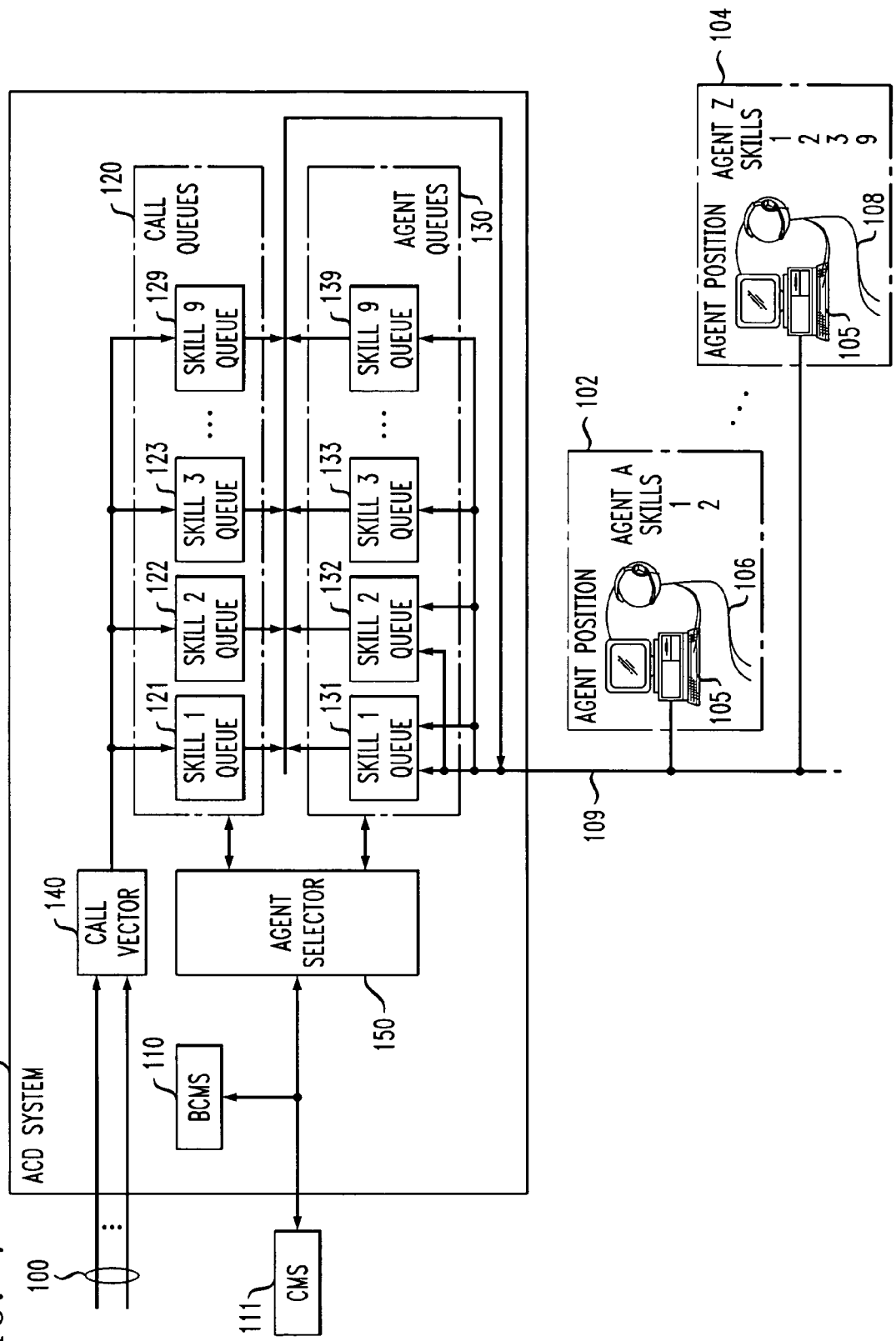
FIG. 1 shows an illustrative call center in which the present invention may be implemented.

FIG. 1 shows an illustrative call center in which the present invention may be implemented. The call center includes a number of telephone lines and/or trunks 100 selectively interconnected with a plurality of agent positions 102-104 via an ACD system 101. Each agent position 102-104 includes a voice-and-data terminal 105 for use by a corresponding agent 106-108 to handle calls. The terminals 105 are connected to ACD system 101 by a voice-and-data transmission medium 109. The ACD system 101 includes a conventional basic call management system (BCMS) 110, and is also connected to a conventional external call management system (CMS) 111. The BCMS 110 and CMS 111 gather call records, call center statistics and other information for use in managing the call center, generating call center reports, and performing other functions. In alternative embodiments, the functions of the BCMS 110 and the CMS 111 may be provided using a single call management system internal or external to the ACD system 101.

Figure 2:
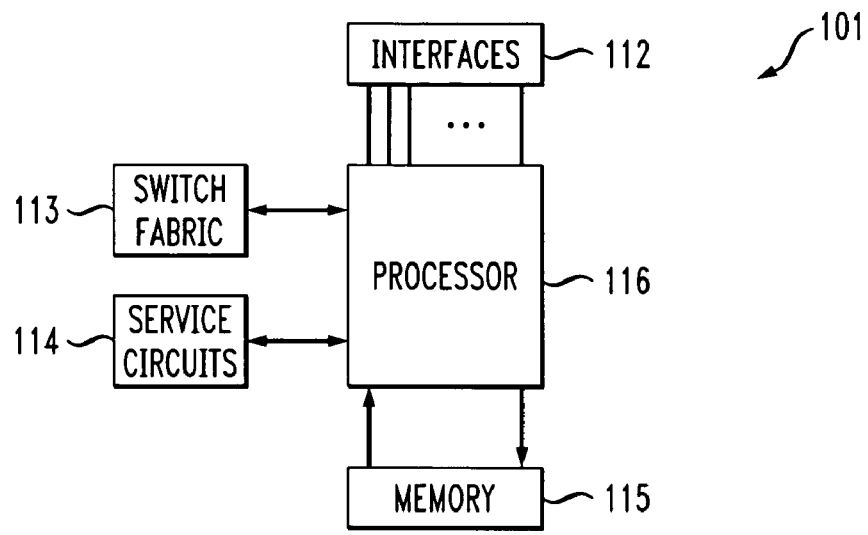
FIG. 2 shows a simplified block diagram of one possible implementation of the automatic call distribution system of FIG. 1.

The ACD system 101 may be implemented in a manner similar to, for example, the Avaya Communication Manager™ from Avaya Inc. of Basking Ridge, N.J. or the Definity™ PBX-based ACD system from Lucent Technologies. FIG. 2 shows a simplified block diagram of one possible implementation of the ACD system 101. The system 101 as shown in FIG. 2 is a stored-program-controlled system that includes interfaces 112 to external communication links, a communications switching fabric 113, service circuits 114 (e.g., tone generators and announcement circuits), a memory 115 for storing control programs and data, and a processor 116 (e.g., a microprocessor, a CPU, a computer, etc. or various portions or combinations thereof) for executing the stored control programs to control the interfaces and the fabric, to provide automatic call distribution functionality, and to provide storage of e-mails, faxes and other communications.

Referring again to FIG. 1, exemplary data elements stored in the memory 115 of ACD system 101 include a set of call queues 120 and a set of agent queues 130. Each call queue 121-129 in the set of call queues 120 corresponds to a different agent skill, as does each agent queue 131-139 in the set of agent queues 130. As in a conventional system, calls are prioritized, and may be, for example, enqueued in individual ones of the call queues 120 in their order of priority, or enqueued in different ones of a plurality of call queues that correspond to a skill and each one of which corresponds to a different priority. Similarly, each agent's skills are prioritized according to his or her level of expertise in that skill, and agents may be, for example, enqueued in individual ones of the agent queues 130 in their order of expertise level, or enqueued in different ones of a plurality of agent queues that correspond to a skill and each one of which corresponds to a different expertise level in that skill. It should be noted that the invention can also be implemented in systems using a wide variety of other types of queue arrangements and queuing techniques.

The ACD system 101 further includes a call vector 140. The call vector 140 may be one of a number of different types of stored control programs implemented in system 101. Calls incoming to the call center on lines or trunks 100 are assigned by call vector 140 to different call queues 121-129 based upon the agent skill that they require for proper handling. Agents 106-108 who are available for handling calls are assigned to agent queues 131-139 based upon the skills which they possess. An agent may have multiple skills, and hence may be assigned to multiple agent queues 131-139 simultaneously. Such an agent is referred to herein as a "multi-skill agent." Furthermore, an agent may have different levels of skill expertise (e.g., different skill levels in a multi-level scale or primary (P) and secondary (S) skills), and hence may be assigned to different agent queues 131-139 at different expertise levels.

Call vectoring is described in greater detail in Definity™ Communications System Generic 3 Call Vectoring/Expert Agent Selection (EAS) Guide, AT&T Publication No. 555-230-520, Issue 3, November 1993, which is incorporated by reference herein. Skills-based ACD techniques are described in greater detail in, for example, U.S. Pat. No. 5,206,903 issued Apr. 27, 1993 in the name of inventors J. E. Kohler et al. and entitled "Automatic Call Distribution Based on Matching Required Skills with Agents Skills," which is incorporated by reference herein.

Another program executing in ACD system 101 is an agent selector 150. Selector 150 may be implemented in software stored either in the memory 115 of system 101, in a peripheral memory (e.g., a disk or CD-ROM) of system 101, or in any other type of computer readable medium associated with system 101, and executed by processor 116 or other suitable processing hardware associated with the ACD system 101. Selector 150 in this exemplary embodiment implements conventional techniques for providing an assignment between available calls and available agents. The conventional techniques implemented by selector 150 are well known in the art and will not be further described herein. It should be noted that these functions could be implemented in other elements of the ACD system 101, or using a combination of a number of different elements in such a system.

Further details regarding call processing in a system such as ACD system 101 can be found in, for example, U.S. Pat. No. 5,905,793 in the name of inventors A. D. Flockhart et al. and entitled "Waiting-Call Selection Based on Anticipated Wait Times," and U.S. Pat. No. 6,192,122, in the name of inventors A. D. Flockhart et al. and entitled "Call Center Agent Selection that Optimizes Call Wait Times," both of which are incorporated by reference herein.

In accordance with the present invention, the call center of FIG. 1 is configured to allocate a resource to requests enqueued in queues 120 using a predicted wait time that is based on a prior contribution of the agents to servicing enqueued requests.

Figure 3:
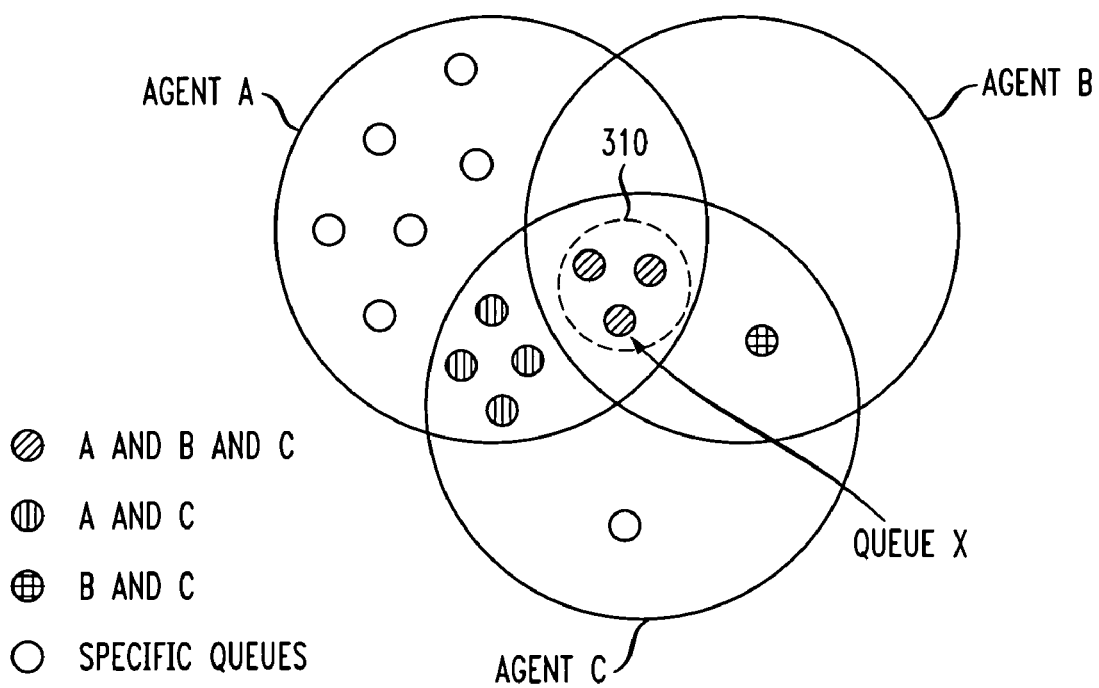
FIG. 3 illustrates an exemplary configuration of agents assigned to service to in a typical call center.

FIG. 3 illustrates an exemplary configuration 300 of agents A, B, C that are assigned to service calls in a typical call center. As shown in FIG. 3, the exemplary agents A, B, C are configured to service 13 queues (Agent A), 4 queues (Agent B) and 9 queues (Agent C), respectively. FIG. 3 indicates a set 310 of queues, including an exemplary queue X, that are serviced by all three agents A, B, C. Based on the configuration shown in FIG. 3, it would be expected that Agent B's contribution to service work from the set 310 of queues will be greater than the contribution of agents A and C who are also configured to service work from many other queues.

To account for the variability in agents to queue assignments, the present invention provides a new formula to adjust the Weighted Advance Time (WAT) that is based on the total queue commitments of an agent. In one exemplary implementation, the Weighted Advance Time is computed as follows.

Initially, the average agent contribution (AAC) to service work from a given queue, X, is calculated. The percentage of time that the agent has spent servicing work from a given queue is calculated, based on past performance. The performance can be evaluated, for example, over a particular sampling period. For example, for a particular sampling work period, the total time that an agent has spent servicing requests from a particular queue, such as the exemplary queue X, can be determined. If during a sampling period of the last 300 hours of work, an agent has spent 140 hours servicing work from queue X, then the agent has contributed (AAC) 46% (140/300*100) of his or her time to servicing queue X.

Thereafter, the current Weighted Advance Time (priorWAT) for exemplary queue can be adjusted, as follows:

$$newWAT = priorWAT \times \frac{\sum \text{contributions of prior working agents}}{\sum \text{contributions of new working agents}}$$

Consider the following example:

1. Agent A, Agent B and Agent C are configured to service work form queue X and have demonstrated the following contributions: Agent A (AAC=8%), Agent B (AAC=25%) and Agent C (AAC=11%).
2. Agent A and C are already available to service work from queue X and the total AAC equals 19% with Agent A contributing 8% and Agent C contributing 11%.
3. The current WAT for queue X is 15 minutes (900 seconds).
4. Agent B having an AAC of 25% becomes available.

The WAT is updated in accordance with the present invention, as follows:

$$newWAT = 900 \times \frac{\sum 8 + 11}{\sum 8 + 11 + 25}$$
$$= 900 * \{19/44\}$$
$$= 388 \text{ seconds.}$$

Figure 4:
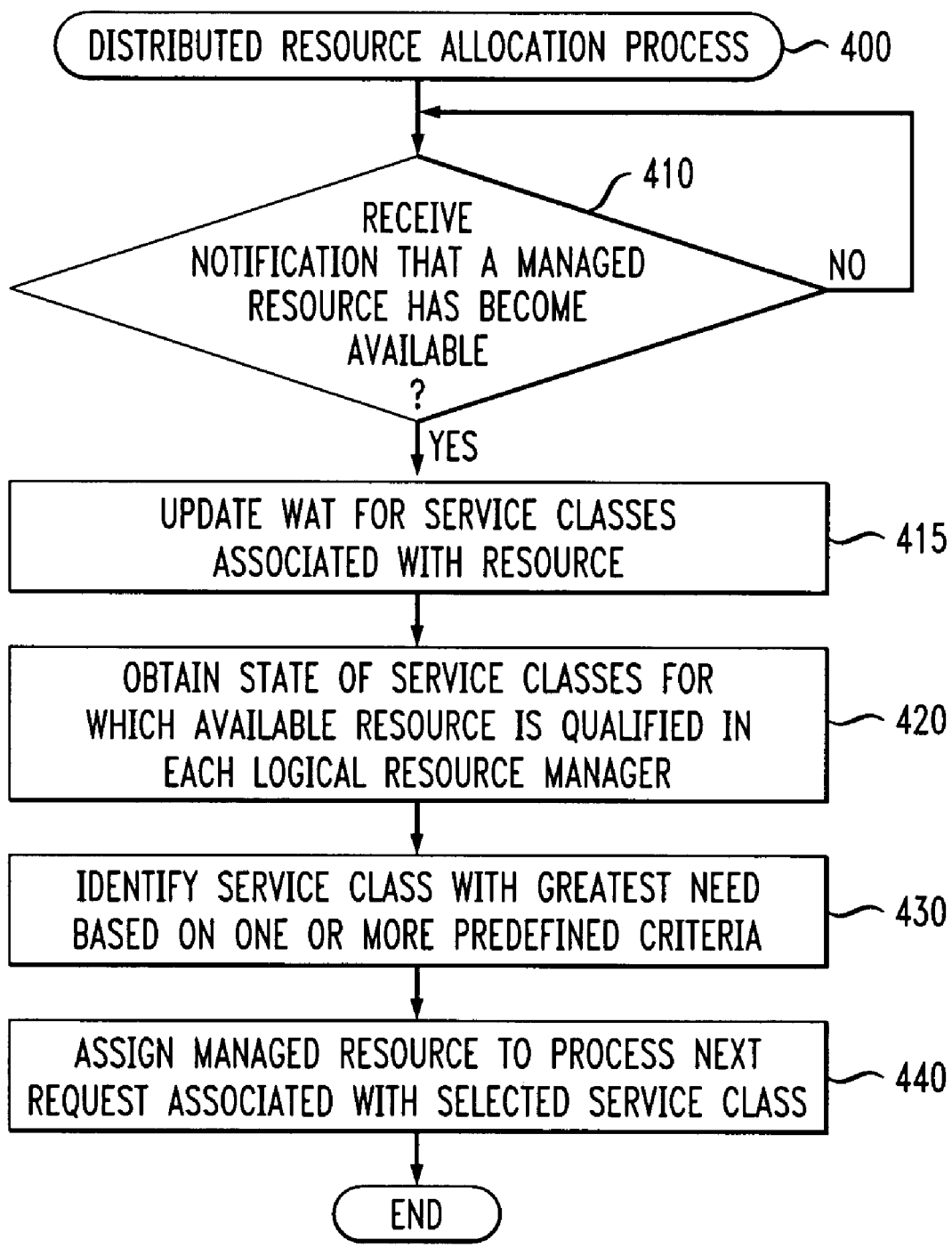
FIG. 4 is a flow chart describing an exemplary implementation of a resource allocation process incorporating features of the present invention.

FIG. 4 is a flow chart describing an exemplary implementation of a resource allocation process 400 incorporating features of the present invention. As shown in FIG. 4, the exemplary resource allocation process 400 is initiated during step 410 upon a notification that a managed resource has become available. For example, in an exemplary call center implementation, an agent may become available upon the successful completion of a prior call.

Once it is determined during step 410 that a managed resource has become available, the available managed resource is matched with a request during steps 415 through 440.

After a resource becomes available, the exemplary resource allocation process 400 updates the WAT of all services classes (queues) that the agent is associated with during step 415. In other words, the WAT is updated for all queues that the agent is configured to service. Thereafter, the resource allocation process obtains the state of the service classes for which the managed resource is qualified (i.e., capable) during step 420. The state of service classes may be obtained, for example, using a publish/subscribe mechanism and may be cached by each resource manager.

In one exemplary embodiment, each service class can progress through multiple states. Each state indicates that the service class is in greater need than the previous state. For example, each state indicates how close the service class is to exceeding its target or how much the service class has progressed beyond its target. It is noted that the "greatest need" generally does not mean that the customer is in the greatest need to speak to an agent. The "greatest need" is based on one or more predefined criteria for selecting which queue 120 should be chosen to meet or preserve goals for customer service and to give customers the desired level of service.

In one exemplary embodiment, one of the following five service class states can be assigned to a queue 120 to indicate the current performance level: over served, within range, future jeopardy, current jeopardy, over threshold. For example, the following table shows the service class states for each of the exemplary call queues 120 shown in FIG. 1:

| Queue No. | Queue Type | Current Service Class State |
| --- | --- | --- |
| Queue 1 | Non-Specific | Within Range |
| Queue 2 | Specific | Within Range |
| Queue 3 | Non-Specific | Over Threshold |
| Queue 4 | Non-Specific | Over Served |
| Queue 5 | Specific | Over Threshold |
| Queue 6 | Non-Specific | Within Range |
| Queue 7 | Non-Specific | Current Jeopardy |
| Queue 8 | Non-Specific | Future Jeopardy |
| Queue 9 | Specific | Within Range |

The service class with the greatest need is identified during step 430 based on one or more predefined criteria. In one exemplary implementation, when multiple service classes are in a state that indicates the greatest need, the resource allocation process 400 prioritizes the assignment of requests to local resources. If the service classes in greatest need include at least one local service class, a local service class is selected. If no local service classes are in greatest need, a remote service class with the greatest need is selected. If two or more remote service classes are in the same state, services classes are selected, for example, based on a round-robin technique, selecting the remote service class with the oldest time stamp. The logical resource manager optionally applies a time stamp to a remote service class when an agent offered for that service class has been accepted.

Once the service class with the greatest need is selected during step 430, the managed resource is assigned during step 440 to process the next request associated with the selected service class. For example, if the service class with the greatest need is a local service class, the request can be obtained from the associated queue 120. If, however, the service class with the greatest need is a remote service class, then the resource can be offered to a remote resource manager, to be matched to work queued at the remote service class.

It is noted that the matching of requests to managed resources can be restricted to resources in a specific location or region, for example, by adding a location qualifier to the service classes. The location qualifier can apply to only one site, or to a region (group of sites). The location qualifier restricts contacts in the service class to be delivered only to that location. For example, a location qualifier can ensure that email contacts received in given country are only handled by agents in the same country.

As indicated above, a call center agent can have one or more capability sets. Each capability set should include the same qualifiers as a service class that the agent can handle. The capability sets are used to match a contact with the agent. If the qualifiers in a capability set match the qualifiers in the service class for a contact, the resource allocation process 400 matches the contact to the agent.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for allocating a resource to one of a plurality of requests, comprising:
    storing each of said plurality of requests in at least one of a plurality of queues, each of said queues having a predicted wait time;
    determining that said resource has become available, wherein said determining step further comprises the step of determining that said resource has become available based on one or more predefined criteria;
    updating said predicted wait times of said queues based on a prior contribution of said resource to said queues, wherein said prior contribution of said resource to said queue comprises calculating a percentage of time an agent has spent servicing work from said queue over a particular sampling period;
    evaluating a performance level of each of said queues relative to one or more service level targets; and
    assigning, in response to said determination, said resource to said request based on said evaluation, wherein said assigning step further comprises the step of evaluating said performance level of each of said queues based on one or more predefined criteria.

2. The method of claim 1, wherein said service level targets include one or more thresholds for said predicted wait time.

3. The method of claim 1, further comprising the step of maintaining state information for a plurality of service classes.

4. The method of claim 1, further comprising the step of storing said request in a queue associated with a given service class.

5. The method of claim 1, wherein said assigning step further comprises the step-of assigning said resource to a service class for which said resource is capable.

6. The method of claim 1, wherein said resource is one of a plurality of call agents associated with a call center.

7. A system for allocating a resource to one of a plurality of requests, comprising:
    a memory comprising a plurality of queues, each of said queues having a predicted wait time; and
    at least one processor, coupled to the memory, operative to:
    store each of said plurality of requests in at least one of said queues;
    determine that said resource has become available, wherein said determining step further comprises the step of determining that said resource has become available based on one or more predefined criteria;
    update said predicted wait times of said queues based on a prior contribution of said resource to said queues, wherein said prior contribution of said resource to said queue comprises calculating a percentage of time an agent has spent servicing work from said queue over a particular sampling period;
    evaluate a performance level of each of said queues relative to one or more service level targets; and
    assign, in response to said determination, said resource to said request based on said evaluation, wherein said assigning step further comprises the step of evaluating said performance level of each of said queues based on one or more predefined criteria.

8. The system of claim 7, wherein said service level targets include one or more thresholds for said predicted wait time.

9. The system of claim 7, wherein said processor is further configured to store said request in one of said queues associated with a given service class.

10. The system of claim 7, wherein said processor is further configured to assign said resource to a service class for which said resource is capable.

11. The system of claim 7, wherein said resource is one of a plurality of call agents associated with a call center.

12. An article of manufacture for allocating a resource to one of a plurality of requests, comprising a machine readable medium containing one or more programs which when executed implement the steps of:

storing each of said plurality of requests in at least one of a plurality of queues, each of said queues having a predicted wait time;

determining that said resource has become available, wherein said determining step further comprises the step of determining that said resource has become available based on one or more predefined criteria;

updating said predicted wait times of said queues based on a prior contribution of said resource to said queues, wherein said prior contribution of said resource to said queue comprises calculating a percentage of time an agent has spent servicing work from said queue over a particular sampling period;

evaluating a performance level of each of said queues relative to one or more service level targets; and assigning, in response to said determination, said resource to said request based on said evaluation, wherein said assigning step further comprises the step of evaluating said performance level of each of said queues based on one or more predefined criteria.

* * * * *